Feb. 10, 1948.　　　　J. M. JONES　　　　2,435,684
ACCOUNTING BOARD
Filed April 6, 1945　　　　2 Sheets-Sheet 1
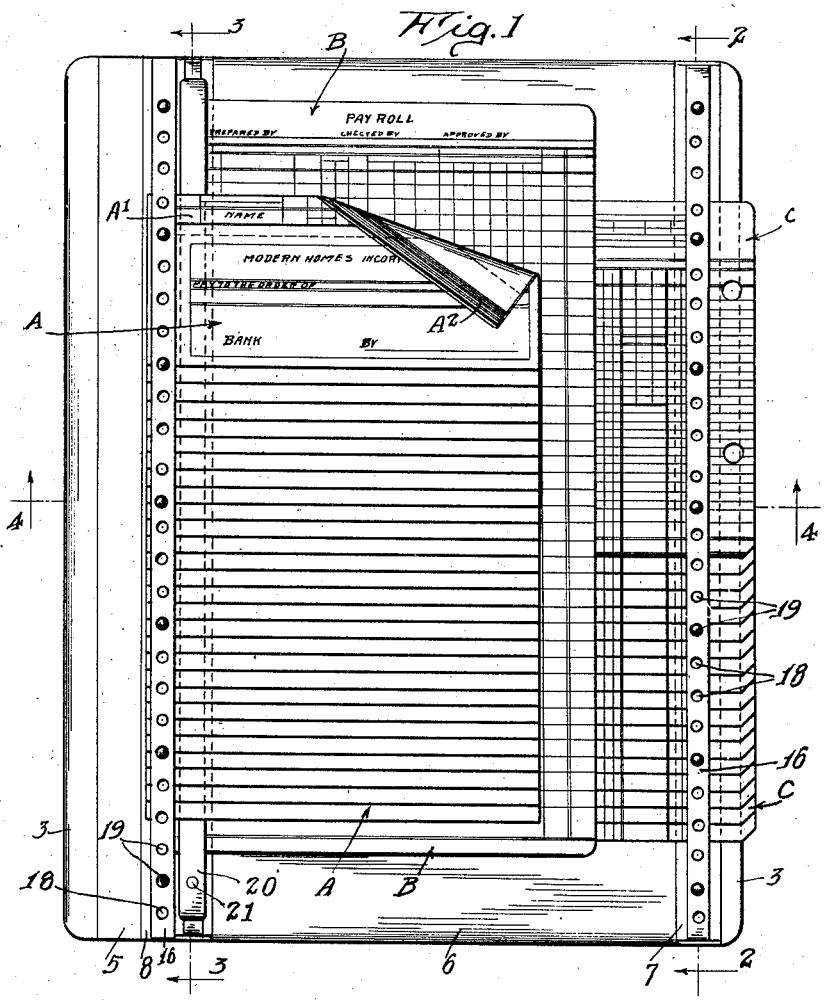
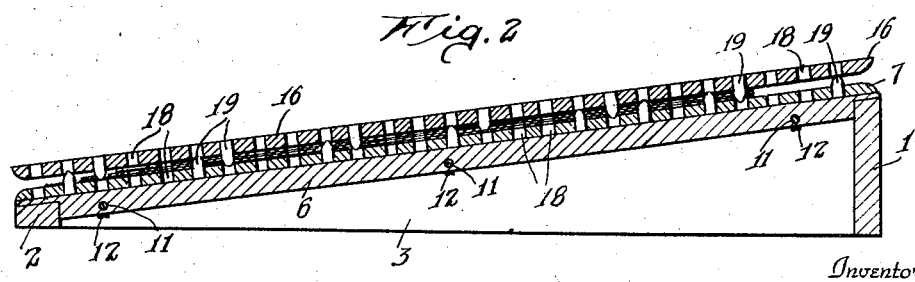
Inventor
Jesse M. Jones
By Lyon & Lyon
Attorneys Feb. 10, 1948.  J. M. JONES  2,435,684
ACCOUNTING BOARD
Filed April 6, 1945  2 Sheets-Sheet 2

Inventor
Jesse M. Jones
By Lyon & Lyon
Attorneys

Patented Feb. 10, 1948

2,435,684

UNITED STATES PATENT OFFICE 2,435,684

ACCOUNTING BOARD

Jesse M. Jones, Los Angeles, Calif., assignor to Charles R. Hadley Company, Los Angeles, Calif., a corporation of California Application April 6, 1945, Serial No. 586,890

6 Claims. (Cl. 282—29)

My invention relates to accounting boards, and among the objects of my invention are:

First, to provide an accounting board which facilitates multiple record bookkeeping and entry, and in particular the making and keeping of accounts on loose leaves that may be permanently or temporarily bound together after completion of the entries.

Second, to provide an accounting board which is particularly applicable in a situation where it is desired to transfer entries made on an original paper to a series of other sheets. By way of example, in payroll accounting it is desirable to draw a series of checks payable to individual employees. This involves individual entries on the series of checks. Simultaneously, it is desirable to compile a composite record or payroll register and to make entries on the cumulative record of each employee. Accordingly, then, my accounting board makes possible such simultaneous entries on three types of records.

Third, to provide a payroll accounting board which is so arranged that should entries be required on the composite payroll record and the cumulative individual employee record; for example, when an employee has no salary due for a given payroll period, a series of checks may be shifted as a group permitting direct entry on the composite record, thus enabling the use of prenumbered checks without requiring individual rearrangement of the series of checks, or voiding of certain checks in order to keep the composite and cumulative records intact.

Fourth, to provide an accounting board of this character, wherein all of the records may be moved bodily upwardly or downwardly on the board so as to place them in the most convenient position for the operator.

Fifth, to provide an accounting board, wherein the series of checks and series of individual payroll records are pre-arranged in echelon form and are conveniently clamped together for handling as a unit.

With the above and other objects in view as may appear hereinafter, reference is directed to the accompanying drawings, in which:

Fig. 1 is a plan view of my accounting board showing various records in position thereon.

Fig. 2 is a longitudinal sectional view through the accounting board, taken through 2—2 of Fig. 1.

Figure 3:
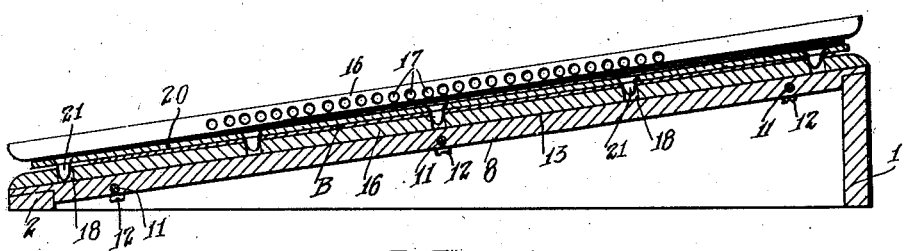
Fig. 3 is another longitudinal sectional view thereof taken through 3—3 of Fig. 1.

The accounting board includes a base frame structure which comprises a rearward wall 1, a forward wall 2, and triangular side walls 3, so arranged as to define an inclined plane on which are mounted top plates 5 and 6. The top plates define slots extending from the forward to the rear wall of the frame structure, and these slots receive panel strips 7 and 8. One of the panel strips 7 may be supported between one of the top plates and the adjacent side wall 3. The other panel strip 8 may be disposed between the two top plates 5 and 6.

The top plates and panel strips as well as the side walls 3, are provided with coacting mating ribs 9 and 10 which enable the top plates, panel strips, and upper margins of the side walls to be flush. Several widths of top plates 5 and 6 may be provided so that the spacing between the panel strips 7 and 8 may be altered, depending upon the type and size of the accounting records placed on the accounting board. Furthermore, various widths of rearward and forward walls may be provided.

The panel strips have greater thickness than the top plates, and are adapted to receive cross bars 11 extending between the side walls 3. The cross bars serve to hold the panel strips and top plates in place on the frame structure, as well as to tie the sides of the frame structure together. Set screws 12 secure the cross bars in their panel strips 7 and 8.

The panel strip 7 has a single longitudinal channel 13, whereas the panel strip 8 has a pair of channels 13. Otherwise, the two panel strips are identical. At least one detent ball 14 projects laterally into each channel 13 and is backed by a spring 15. Each channel is adapted to receive a retainer bar 16 which is rectangular in cross-section and provided along its vertical sides with a series of catch indentations 17. The indentations confronting the sides of the channels 13 having the detent balls 14, are engaged by the detent balls so that the retainer bars may be held in a plurality of positions longitudinally of the panel strips 7 and 8.

Each of the retainer bars is provided with a series of holes 18 extending from top to bottom. Selected holes are provided with pins 19 projecting outwardly from one side of the retainer bar 16. It has been found convenient to secure such a pin in every fourth hole. The holes 18 and pins 19 of a pair of retainer bars, coact to clamp the margin of a record sheet or a series of record sheets in echelon, as will be described hereinafter.

One of the retainer bars which fits in the panel strip 8, while identical to the others, receives a retainer strap 20 preferably formed of thin sheet metal and having a series of pins 21 similar to the pins 19 adapted to enter corresponding holes 18. The retainer bar 16 and its retainer strap 20 are particularly intended to clamp a single record sheet.

While the accounting board structure described hereinbefore may be employed for various types of records, it is particularly applicable for use in conjunction with payroll records. Such payroll records involve checks A, that is, individual records; a payroll register B, that is, a composite record; and an employee's earnings record C, that is, a cumulative record.

Each check A is provided with a linear entry space $A_1$ preferably extending along the top margin. This entry space may provide for the employee's name as well as various deduction entries, such as social security, old age benefit, or bond purchases, insurance, etc., and the amount of the check. The reverse side of the check may have a carbonized surface $A_2$ behind the entry space $A_1$ as shown in Fig. 1. The checks are provided with a series of holes along one margin, so that they may be stacked in echelon form with their perforated margins fitting the pins of one of the retainer bars 16. When the stack of checks is completed, a mating retainer bar 16 is placed thereover and coacts with the first bar to clamp the stack or group of checks so that they may be handled as a unit. This operation need not be done on the accounting board, but may be done at any other convenient place.

Similarly, a series of employee's earnings record C is stacked in echelon form on a retainer bar 16. These records are provided with a perforated margin at the opposite side from the perforated margin of the checks A. As with the checks A a second retainer bar is inserted when this stack is completed, so that the stack may be clamped and handled as a unit.

Figure 4:
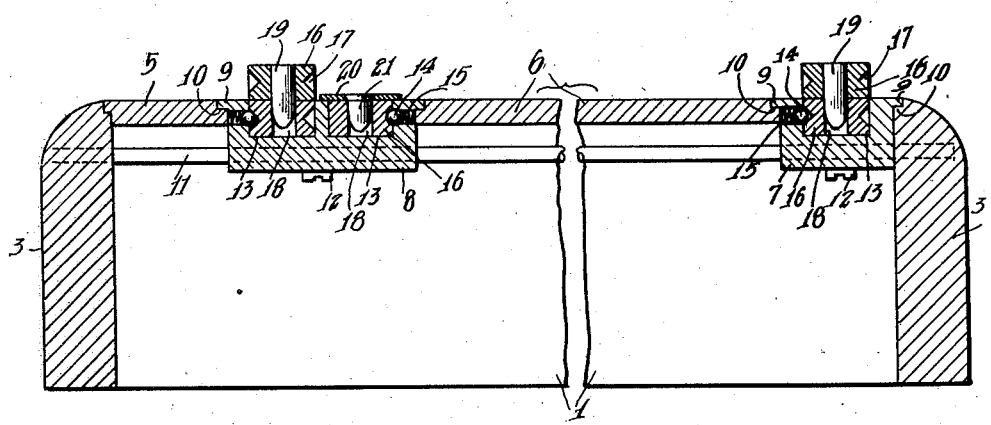
Fig. 4 is an enlarged transverse sectional view taken through 4—4 of Fig. 1.

The retainer bars which clamp the employee's earnings or cumulative record stack, are fitted in the channel of the right-hand panel strip 7 shown in Figs. 1 and 4, whereas the retainer bars 16 which hold the stack of checks A, are placed in the left-hand channel of the panel strip 8, as viewed in Figs. 1 and 4. The payroll register B, which is usually in the form of a single sheet, is clamped between the retainer strip 20 and one of the retainer bars, and this retainer bar is placed in the remaining channel, this being done, of course, before placing the checks A. A carbon paper is inserted under the payroll register B.

When the various records have been properly assembled, entries may then be made in the entry space $A_1$ of the uppermost check. This record will then appear on the payroll register B and the employee's earnings record C. When this entry is completed, the uppermost check is torn off. The edge of the adjacent retainer bar may serve to facilitate tearing the check, and in addition the check may be suitably perforated. The next check is then exposed for entry, and this operation continues until all of the checks have been filled in.

If for any reason an employee has been absent and therefore has no check due him for the payroll period, the entire stack of checks held by the retainer bars may be moved downward a distance between adjacent catch indentations 17. The appropriate entries for this employee may then be made directly on the payroll register B and his composite record C. This operation is extremely important for checks are numbered consecutively, and much time would be lost if it were necessary to rearrange the stack of checks A each time it is necessary to omit payment to an employee.

It should be pointed out that while the checks are uniformly spaced because the entries are always made in a given region of the check, preferably the upper margin, this is not necessarily the case with the employee's records. As Fig. 1 indicates, it would appear that all of the employees have previous employee records of identical length. Actually, this is not the case. Therefore, each employee composite record is positioned so that the first vacant line is in proper position to correspond with the entry space $A_1$ of the check.

Many other embodiments of the invention may be resorted to without departing from the spirit of the invention.

I claim:

1. An accounting board comprising: a base structure defining a closely related pair of channels along one margin and a single channel along its opposite margin; lower retainer bars slidable in said channel, each retainer bar having a plurality of means registerable with perforations in the margins of accounting blanks; and mating upper retainer bars coacting with said lower retainer bars to clamp said accounting record blanks therebetween; said registerable means including pins extending from at least one of each pair of coacting retainer bars through said accounting blanks into its mated retainer bar; the side walls of said channels and the sides of said retainer bars having coacting detent and multiple indentation means for holding said retainer bars in a plurality of adjusted positions along said accounting board.

2. An accounting board comprising: a base structure defining a closely related inner and outer channel along one margin and a single channel along its opposite margin; lower retainer bars slidable in said channels, each retainer bar having a plurality of means registerable with perforations in the margins of accounting blanks; a clamping strip fitting the retainer bar located in said inner channel to secure an accounting record; and upper retainer bars identical with said lower retainer bars coacting with the remaining retainer bars to clamp a plurality of accounting records in echelon; said registerable means including pins extending from each of said retainer bars into its mate, said records in echelon adapted to be disposed above and below the accounting record secured between said clamping strip and its corresponding retainer bar, said clamping strip and upper retainer bars presenting protuberance-free upper surfaces; the side walls of said channels and the sides of said retainer bars having coacting detent and multiple indentation means for holding said retainer bars in adjusted positions along said accounting board.

3. An accounting board, comprising: a frame structure; a work surface supported in an inclined position thereby, said work surface including plate members defining slots having stepped margins and complementary panels fitting in said slots and supported by said margins; tie means extending between the sides of said frame structure to secure said plate members and panels; said panels defining longitudinal channels; lower retainer bars slidable in said channels, each retainer bar having a plurality of means registerable with perforations in the margins of accounting blanks; and mating upper retainer bars coacting with said lower retainer bars to clamp said accounting record blanks therebetween.

4. An accounting board, comprising: a frame structure; a work surface supported in an inclined position thereby, said work surface including plate members defining slots having stepped margins and complementary panels fitting in said slots and supported by said margins; tie means extending between the sides of said frame structure to secure said plate members and panels; said panels defining longitudinal channels; lower retainer bars slidable in said channels, each retainer bar having a plurality of means registerable with perforations in the margins of accounting blanks; and mating upper retainer bars coacting with said lower retainer bars to clamp said accounting record blanks therebetween; the side walls of said channels and the sides of said retainer bars having coacting detent and multiple indentation means for holding said retainer bars in a plurality of adjusted positions along said accounting board.

5. An accounting board comprising: a frame structure; a work surface supported in an inclined position thereby, said work surface including plate members defining slots having stepped margins and complementary panels fitting in said slots and supported by said margins; tie means extending between the sides of said frame structure to secure said plate members and panels; one of said panels defining an inner and an outer channel, the other a single channel; lower retainer bars slidable in said channels, each retainer bar having means registerable with perforations in the margins of accounting blanks; a clamping strip fitting the retainer bar in said inner channel to secure an accounting record; and upper retainer bars identical to said lower retainer bars coacting with the remaining retainer bars to clamp a plurality of accounting records in echelon, said records in echelon disposable above and below the accounting record secured between said clamping strip and its corresponding retainer bar.

6. An accounting board comprising: a frame structure; a work surface supported in an inclined position thereby, said work surface including plate members defining slots having stepped margins and complementary panels fitting in said slots and supported by said margins; tie means extending between the sides of said frame structure to secure said plate members and panels; one of said panels defining an inner and an outer channel, the other a single channel; lower retainer bars slidable in said channels, each retainer bar having means registerable with perforations in the margins of accounting blanks; a clamping strip fitting the retainer bar in said inner channel to secure an accounting record; and upper retainer bars identical to said lower retainer bars coacting with the remaining retainer bars to clamp a plurality of accounting records in echelon, said records in echelon disposable above and below the accounting record secured between said clamping strip and its corresponding retainer bar; the side walls of said channels and the sides of said retainer bars having coacting detent and multiple indentation means for holding said retainer bars in a plurality of adjusted positions along said accounting board.

JESSE M. JONES.

REFERENCES CITED

The following references are of record in the file of this patent:

UNITED STATES PATENTS

| Number | Name | Date |
|---|---|---|
| 2,344,453 | Payne | Mar. 14, 1944 |

FOREIGN PATENTS

| Number | Country | Date |
|---|---|---|
| 101,946 | Great Britain | Nov. 2, 1916 |
| 674,234 | France | Oct. 21, 1929 |
| 559,924 | Germany | Sept. 26, 1932 |